US010783570B1

United States Patent
Mikkola (10) Patent No.: US 10,783,570 B1
(45) Date of Patent: Sep. 22, 2020

(54) METHOD, SYSTEM, AND NON-TRANSITORY COMPUTER-READABLE STORAGE MEDIA DEVICE FOR CROSS-DOMAIN NAVIGATION GUIDANCE

(71) Applicant: HBI Branded Apparel Enterprises, LLC, Winston Salem, NC (US)

(72) Inventor: John Mikkola, Winston-Salem, NC (US)

(73) Assignee: HBI Branded Apparel Enterprises, LLC, Winston Salem, NC (US)

(*) Notice: Subject to any disclaimer, the term of this patent is extended or adjusted under 35 U.S.C. 154(b) by 862 days.

(21) Appl. No.: 15/286,332

(22) Filed: Oct. 5, 2016

(51) Int. Cl.
  *G06Q 30/06* (2012.01)
  *H04L 29/08* (2006.01)

(52) U.S. Cl.
  CPC ..... *G06Q 30/0633* (2013.01); *G06Q 30/0601* (2013.01); *G06Q 30/0641* (2013.01); *G06Q 30/0643* (2013.01); *H04L 67/22* (2013.01); *H04L 67/02* (2013.01)

(58) Field of Classification Search
  None
  See application file for complete search history.

(56) References Cited

U.S. PATENT DOCUMENTS

| | | | |
|---|---|---|---|
| 7,197,475 B1 | 3/2007 | Lorenzen et al. | |
| 9,037,963 B1* | 5/2015 | Chandi | G06F 16/95 715/234 |
| 9,922,327 B2* | 3/2018 | Johnson | G06Q 30/00 |
| 2008/0183593 A1* | 7/2008 | Dierks | G06Q 20/102 705/26.35 |
| 2014/0052550 A1 | 2/2014 | Glazer et al. | |
| 2014/0279214 A1 | 9/2014 | Wagoner-Edwards et al. | |
| 2017/0116643 A1* | 4/2017 | Berg | G06Q 30/0623 |

OTHER PUBLICATIONS

New Google Chrome Extension Provides Universal Shopping Cart, Makes Entire Internet Shoppable Jessica Douglas, Shoppable, Nov. 17, 2015. (Year: 2015).*
Angeles, "Information Technology Infrastructure Support for Omnichannel Retailing," Workplace Review, Apr. 2016, 13 pages.
Azmi, "Design Development and Implementation of Agriculture Online Service System," A Minor Thesis for Partial Fulfilment of the Degree of Master of Science in Computer Science, Nov. 2001, 66 pages.
Guy, "Consumers can Access a Universal Shopping Cart using Shoppable for Google Chrome," Dec. 9, 2015, 3 pages.
Vizard, "E-Commerce goes Multilingual," InfoWorld, Jul. 19, 1999, 21, 29; ProQuest Technology Collection, p. 16.

\* cited by examiner

*Primary Examiner* — Michael Misiaszek
*Assistant Examiner* — Jason B Warren
(74) *Attorney, Agent, or Firm* — Fish & Richardson P.C.

(57) ABSTRACT

A computer-implemented method is discussed. The method includes displaying to a user of a web browser one or more items from a first web domain; receiving a selection of a first item and adding the first item to a cross-domain tracking system; receiving an input and determining that the received input indicates that the user intends to navigate to a second web domain; and displaying a message that indicates that, if the user navigates to the second web domain, the first item will be maintained available to the user by the cross-domain tracking system after the user navigates to the second web domain.

24 Claims, 4 Drawing Sheets

METHOD, SYSTEM, AND NON-TRANSITORY COMPUTER-READABLE STORAGE MEDIA DEVICE FOR CROSS-DOMAIN NAVIGATION GUIDANCE

TECHNICAL FIELD

The subject matter of this document generally relates to computer navigation, for improving the operation of various computer systems.

BACKGROUND

Computer users who navigate the web open themselves to a variety of forms of illicit attacks from various forms of malware. To make web browsing more secure, modern browsers include features to prevent malware from watching a user's browsing, from presenting on a browser imitation content to cause a user to think they are dealing with a real web site when they are actually dealing with malware (a so-called "man in the middle" attack), and to block other illicit techniques so as to maximize browser security. One such approach to security involves placing restrictions on how information from one web domain (e.g., www.example1.com) can interact in a browser with information from another domain (e.g., www.example2.com). This helps prevent computer malware code from an illicit site from attacking a legitimate site like a bank or web retailer.

While such browser security restrictions can prevent improper activity by malware, they can also interfere with legitimate activity of good web sites. For example, two business organizations that each operate different domains may agree to cooperate with each other, and such cooperation may involve permitting easier user navigation between their two (or more) web domains, such as by providing a user interface element that travels between, and persists between, the two domains when a user navigates from one domain to the other. This may provide great continuity for the user of a computer system who is using a browser or similar application.

SUMMARY

This document generally describes systems, methods, devices, and other techniques for improving computer systems that permit navigation from one web domain to another. In certain examples described here, a user may invoke a portable structure, such as a shopping cart, when the user is viewing a page from a first domain in the user's browser. Such invocation may occur in a familiar manner, such as by the user clicking a "buy" button adjacent to a graphical depiction of and textual description of the product. The user may then decide that he or she wants to browse for a different kind of product. That different product may be so different that it is not even carried by the site where the user selected the first product. Thus, the user may decide to switch to another site. That action may be aided by physical user interface structures, such as icons, that show logos or other indications for the other site and various related sites that each carry a different type of products. For example, a linear ribbon of icons can be displayed with the first web site, where each icon in the ribbon shows a logo for a site associated with an operator of the first web site, and where selection of a respective icon causes the respective web site to be rendered in a browser (e.g., one site that specializes in shoes, another that specializes in casual clothing, another that specializes in sports clothing, and another that specializes in accessories).

However, the user may worry that switching to a second site will cause it to lose the first product that the user chose to buy at the first web site—i.e., that the shopping cart will not persist after the user switches to the new site. To alleviate this concern, the system described here may, when it determines that the user wants to go to another related site, display a message to the user to indicate that the first product's tracking will not be lost when the web site switch occurs—that the shopping cart will persist after the switch. The system may do so by displaying a pop up textual and/or graphical message when a user hovers over or near an icon or link to be taken to the other site, and may appear before the user makes the selection. If the user moves off the icon or link, the message may disappear, and may then reappear if the user hovers again. If the user clicks on a particular one of the icons for the other domains/sites or otherwise indicates a present intent to have the other site loaded, the load may occur, the message may disappear, and a shopping cart that was displayed or adjusted by the user's selection of the item at the first site may persist in its display from the first site to the second, so as to maintain visual continuity for the user. For example, a shopping cart may be displayed as an icon and/or a monetary amount of accumulated goods in a header of the web page, and the header and its particular displayed information may be maintained when the body of a web page changes to another domain to display a different web page.

In some implementations, the various techniques described herein may achieve one or more of the following advantages. To begin, a structure for receiving items from different web sites of different domains can be provided even in the presence of restrictions on communications between the different domains with a web browser. That structure may be visually intuitive and may allow a user to perform a sub-set of preparatory transactions (e.g., adding items to a shopping cart) at each of multiple web sites, and then carry out a single closing transaction for all of the preparatory transactions at the end of a session (e.g., ordering and buying the items). If a user does not have experience with such a collection of sites, and may worry that navigation away from one site will cause her to lose her prior preparatory transactions from that site, the system can provide a mechanism, by presenting an explicit message to the user, to highlight to the user, before the user makes the switch but after the user indicates an intent to make the switch, that the selected items will persist after the user makes the switch to a different domain.

Some implementations described herein can include a computer-implemented method. The method can include displaying to a user of a web browser one or more items from a first web domain; receiving from the user a selection of a first item of the one or more items from the first web domain, and adding the first item to a cross-domain tracking system; receiving from the user an input and determining that the received input indicates that the user intends to navigate the web browser to a second web domain that is different than the first web domain; displaying to the user a message that indicates to the user that, if the user navigates to the second web domain, the first item will be maintained available to the user by the cross-domain tracking system after the user navigates to the second web domain; receiving a user selection to navigate to the second web domain; displaying a web page from the second web domain; receiving from the user a selection of a second item displayed on the web page; and adding the selected second item to the cross-domain tracking system to reside in the cross-domain tracking system with the first item.

In some aspects, the method also comprises associating a price in the cross-domain tracking system with each of the first selected item and the second selected item, and displaying with the cross-domain tracking system a total price for the first selected item and the second selected item. Moreover, the method may comprise displaying, before receiving the input from the user, in a defined area separated from a page of the first domain, a graphical representation that indicates the first user selection was made; continuing to display the graphical representation while displaying the message to the user that indicates that the first item will be maintained available to the user; and continuing to display the graphical representation while displaying the web page from the second web domain. As another example, the method can additionally include displaying a plurality of icons that each represent a different web domain and that, when selected by a user, take the user to a web page for a respective web domain, and wherein determining that the user intends to navigate the web browser to a second web domain comprises determining that the user has placed a user interface pointer over one of the icons. The plurality of icons can be displayed in a linear ribbon along a peripheral edge of a web page for the first domain.

In certain other aspects, the cross-domain tracking system operates in one or more iframes for a web page from the first web domain and the web page from the second domain. Alternatively or in addition, the cross-domain tracking system can generate views of items selected at multiple domains from a particular one of the domains from which an item is selectable, using a transaction identification number submitted with an HTTP request for a web page from the particular one of the domains. Also, the cross-domain tracking system can be operated separately from the first domain and the second domain, and receives communications from servers for the first domain and the second domain when an item from a respective domain is selected by the user.

In another implementation, one or more electronic devices are disclosed that have tangible, non-transitory recording media that store instructions that, when executed by one or more processors, perform a series of operations. The operations may include displaying to a user of a web browser one or more items from a first web domain; receiving from the user a selection of a first item of the one or more items from the first web domain, and adding the first item to a cross-domain tracking system; receiving from the user an input and determining that the received input indicates that the user intends to navigate the web browser to a second web domain that is different than the first web domain; displaying to the user a message that indicates to the user that, if the user navigates to the second web domain, the first item will be maintained available to the user by the cross-domain tracking system after the user navigates to the second web domain; receiving a user selection to navigate to the second web domain; displaying a web page from the second web domain; receiving from the user a selection of a second item displayed on the web page; and adding the selected second item to the cross-domain tracking system to reside in the cross-domain tracking system with the first item. Additional operations may include those discussed for the computer-implemented method.

In yet another implementation, a computer-implemented system is disclosed. The system includes one or more computer processors and tangible, non-transitory computer-readable media connected to the one or more processors. The media store instructions that, when executed by the one or more computer processors, implement operations comprising displaying to a user of a web browser one or more items from a first web domain; receiving from the user a selection of a first item of the one or more items from the first web domain, and adding the first item to a cross-domain tracking system; receiving from the user an input and determining that the received input indicates that the user intends to navigate the web browser to a second web domain that is different than the first web domain; displaying to the user a message that indicates to the user that, if the user navigates to the second web domain, the first item will be maintained available to the user by the cross-domain tracking system after the user navigates to the second web domain; receiving a user selection to navigate to the second web domain; displaying a web page from the second web domain; receiving from the user a selection of a second item displayed on the web page; and adding the selected second item to the cross-domain tracking system to reside in the cross-domain tracking system with the first item. The operations may additionally include the steps described above for the computer-implemented method.

Particular variations may be implemented also, and the inventions here are defined by the claims presented here and as described in the description above and below.

DETAILED DESCRIPTION

This document generally describes systems, methods, devices, and other techniques for implementing the serving of navigational aids to users of web browsers. In particular implementations, the navigational aids may be provided in the context of a web browser user who is moving from a web page on a first internet domain to a web page on a second domain. The context may also include a requirement that items from, or actions taken at, the first page, persist after the user's navigation to the second page. For example, a user may have selected items to place into a shopping cart at a first page, and may wish to have that partially-filled shopping cart follow the user after the user switches to the second page. In particular examples, the user may be provided a message by a system before the user switches to the second page, such as by a textual message that indicates that a shopping cart will be maintained at the second page if the user navigates to the second page.

The textual message may be provided upon the system determining that the user wishes to navigate to the second page, such as by determining that the user has hovered a user interface pointer over an icon or other link whose selection will direct the user to the second page. The icon or other link may be one in a group of icons or links, where each member of the group will take the user to a different web page and different domain than the other members of the group. Once the user finishes navigating, which may occur to one or more of the multiple sites that are capable of sharing the common shopping cart, the user may then check out from whichever one of the sites the user is on when he or she wishes to stop browsing and to purchase all items in the shopping cart (perhaps after editing the shopping chart, e.g., by selecting a particular product to remove from the cart or change the quantity of).

In this manner, then, the system may allow convenient and useful navigation by a user, while also indicating to the user that the state of their browsing will be maintained even though they are moving to a different page and domain.

Figure 1:
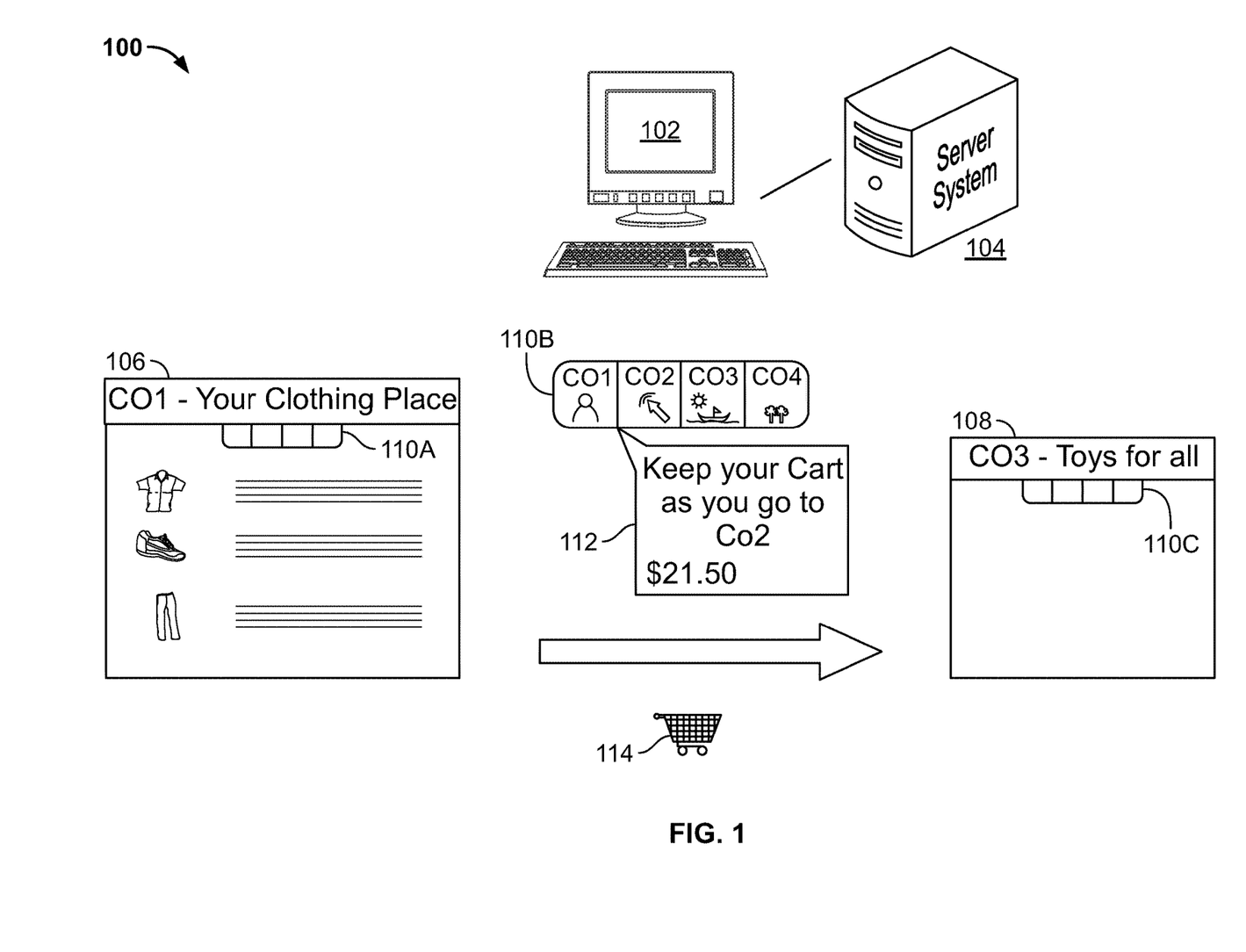
FIG. 1 is a conceptual diagram of a computer system for aiding cross-domain navigation.

FIG. 1 is a conceptual diagram of a computer system 100 for aiding cross-domain navigation. In general, the system 100 presents to a user a message that explicitly informs the user that the state of activities the user has taken on a first page 106 (e.g., selection of items to be placed into a cross-domain shopping cart) will be maintained even after the user switches to a second page 108, including where each of the pages 106, 108 is served from a different web domain.

Referring now to particular structural components in the system 100, a computer 102 is shown and represents a client device executing a web browser or other similar application. The computer 102 may take a variety of forms, including a desktop computer, a tablet, a laptop, a smart phone, or other form of computer for navigating through internet web pages. In such navigation, the computer 102 communicate with a server system 104, which may represent one or more servers and one or more server subsystems to provide typical user interaction in web browsing. For example, the server system 104 may represent server systems from multiple different merchants that have web presences, and that permit users to review products that are available for sale and to order and pay for such products. The server system 104 may receive requests such as HTTP requests from various client computers and may respond with code in various forms, such as HTML, JavaScript, and CSS, along with content such as content that is included in the mark-up HTML code.

Web page 106 represents a page that the user is currently viewing, and is a page for a clothing retailer that sells clothing through the page to be mailed to the user. In this example, the organization that operates page 106 is named CO1 for simplicity, and has a pitch line of "your clothing place." Also in this example, the user has already elected to purchase a pair of pants from the merchant, as indicated by a representation of shopping cart 114 shown in a lower right corner of the web page 106. By shopping cart, the term is meant to include various representations of a virtual structure that represents one or more items a user has selected to purchase, pending a check out process to make payment for the items and to finalize their acquisition—and would include cart representations, shopping bag representations, and other such representations. The shopping cart representation may be located in various parts of the display, including in a header for a web page. Typically, it will be beneficial to have the cart be represented at a location that is common across the different domains and/or pages that share the cart, that it include a graphical element that represents something that holds purchased goods (e.g., a cart or bag), and that it include an indication of what is currently in the shopping cart 144, such as a number of items or a total cost of the items in the shopping cart 114.

The shopping cart 114 may have been generated in various manners in response to the user selecting to purchase the pair of pants. For example, the shopping cart 114 may be represented in a window or tab that is separate from that of the web page 106. As another example, the shopping cart 114 may be generated in an iframe element carved into page 106 at a particular location that is determined to be visually pleasing to a user of the system 100. In other examples, the shopping cart 114 may represent more than one item if a user has already selected more than one item to purchase but has not yet checked out to empty the shopping cart 114 and pay for the items. Those items may all have come from web page 106 or other pages for the domain of web page 106, or may have come from prior browsing by the user at other domains different than the domain for web page 106.

At the top of web page 106 is shown a navigation ribbon 110A. The navigation ribbon 110A is a visible structure generated by the merchant that provided web page 106 and also provides a number of other web pages, such as web page 108, which may be served from a different domain as compared to web page 106 (and each f the other stores may be served, respectively, from a different domain also). Each such web page may be represented by an icon within navigation ribbon 110A. Navigation ribbon 110A may be dynamic, in that the current web page will not be represented in navigation ribbon 110A, but all other web pages operated by the merchant will be. Thus, if a user navigates from one web page to another, the latter web page will not appear anymore in the navigation ribbon 110A once it is navigated to, and will be replaced by an icon for the initial or prior web page that the user will no longer be on. (In certain implementations, clicking on an icon in the ribbon 110A to open another page may cause a new tab to be opened, so that the prior and next pages are displayed on respective tabs.)

Navigation ribbon 1106 in the middle of the figure represents one such arrangement of four different icons. In this example, four different company names are shown in four distinct icons in navigation ribbon 1106, where a user selection of a respective icon will cause a web page that is presented to a user to switch to the page associated with the particular company for that user-selected icon. In this example, the companies are named, for convenience, CO1 to CO4, so that perhaps the user is at a web page for a CO5 company of the common organization. (Each page may be operated by a different division of the same corporation even though multiple "companies" are mentioned here—the distinction between the pages represented by each icon are generally drawn by whether the different sites present as distinct stores and/or brands to a user so that the user would tend to believe that their shopping cart might not follow them to the new store/brand.)

At the relevant time in this figure, a user has hovered a pointer 116 over the icon for company CO2. The system has identified where the hovering of pointer 116 has occurred relative to the icons, and from that, has made a determination that the user intends to navigate to a web site for company CO2. In response to that determination, the system causes code to be delivered to computer 102 or activated on computer 102 if it is already been delivered, so as to generate alert pop-up box 112 which may be displayed superimposed over web page 106 or a similar web page such as a web page for company CO5 (for when the user has switched to such page, and the row of buttons has been maintained in place thought updated to represent the pages to which the user can now navigate at the present time, and not the page the user is currently viewing).

Text in the pop-up box 112 indicates explicitly to the user that the shopping cart 114 will be preserved if the user clicks to move to a web page for company CO2. In this example, the explicit text is "keep your cart as you go to CO2." Other example text may include "your card will follow you to the new site," "Merchant's shopping cart is portable from site to site," "many stores, one shopping bag," "all sites share the bag," and "enjoy your experience at CO2 and check out when you are done shopping." As an additional indicator to a user that the system knows that the user has put items in a shopping cart 114, the value of the total items in the shopping cart is displayed in box 112. Such a display further reinforces for the user that the system knows about the status of shopping cart 114 and will maintain that status if the user is to click on the icon in ribbon 1106.

The user may interact with the ribbon 1106 in multiple ways. For example, the user may move pointer 116 away from ribbon 1106 and continue browsing on web page 106. As one example, the user may determine that he would like to buy a pair of shoes and may select a buy button for shoes that are displayed on web page 106, or may move to another web page, for company CO1, that is linked to by web page 106. Alternatively, the user may click on one of the icons in ribbon 1106 which may cause an HTTP request for the selected web page to be sent to server system 104. Such a selection may also cause pop-up box 112 to disappear because its message is no longer needed, since the user has selected to navigate and does not need to be told what will happen if the user performs such navigation.

Web page 108 shows a result of the user clicking on the icon for company CO2 in ribbon 1108. The display for computer 102 has now switched to a web page for company CO2, whose tagline is "toys for all" to represent that this company or store managed by the merchant sells toys, whereas the previous company or store (company CO1) sold clothing. Here, the pop-up 112 is no longer displayed, and the ribbon has changed to a ribbon 110C. Such a ribbon 110C would be similar to ribbon 1108, but would not show an icon for company CO2. The state of the shopping cart may also be displayed, after such a transition, in the same location and in the same arrangement as it was displayed before the transition to the second company/store that may be hosted by a second domain that differs from the domain for the prior displayed page.

In this manner, then, the user can be allowed to navigate between sites from different web domains while maintaining state for items the user has selected from each of those domains, such as by maintaining the state of items to be purchased in a portable shopping cart. The user may also be notified in advance that the items will travel with the user as the user moves from one domain to the next, so the user is not left to wonder whether the items will go with them, and then perhaps not choose to go to another site out of a concern that the items will not go. As a result, the user is benefited by being able to more readily see the results of navigation between web pages and to thus navigate more smoothly. The merchant or other provider of the web site is benefited by having an improved user experience for the user.

Figure 2:
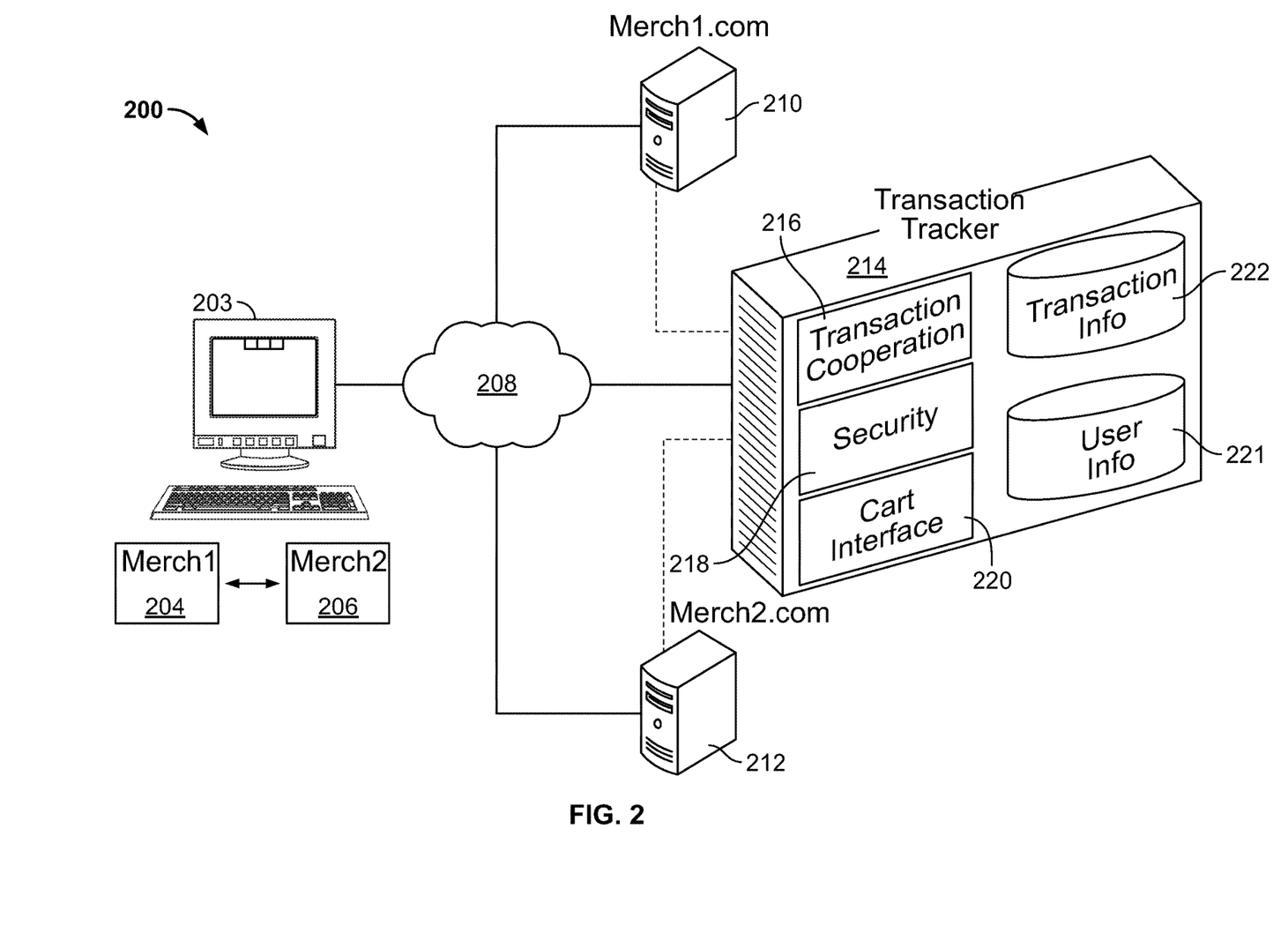
FIG. 2 depicts a system for tracking user transactions between distinct domains.

FIG. 2 depicts a system 200 for tracking user transactions between distinct domains. In general, the system provides functionality like that discussed with respect to FIG. 1 above, and shows additional detail for particular structures that may provide that functionality.

The system 200 is centered around a network 208, which may include the internet and other networks such as LANs and WANs operated by private parties. Connected to the internet and rest of network 208 is a client computer 202 which may be operated by a typical computer user, such as a user seeking to surf the internet using a web browser loaded on the client computer 202. In typical implementation, the system 200 would include thousands of clients like client 202, and multiple of such clients may attempt to access the system 200 simultaneously and over time. Each such client computer may be provided with a similar experience (e.g., a home page showing similar items that are for sale), though it may be customized for them (e.g., showing their user name and personal shopping cart).

Shown associated with the client computer 202 is a pair of web pages 204, 206. The first web page 204 is generated by merchant one, while the second web page 206 is generated by merchant two. Merchants one and two may, in appropriate circumstances, be different arms of a single corporate organization, such as the clothing and toys retailers discussed above with respect to FIG. 1. An arrow between the two web pages for the merchants indicates a user is enabled by the system 200 to readily navigate between those pages, and may be given guidance about the persistence of a structure such as a virtual shopping cart when such navigation occurs, as also described with respect to FIG. 1.

Web page 204 is served by server 210 which is domain "merch1.com," while web page 206 is served by web server 212, which is "merch2.com." Each of server 210 and 212 may take a standard form for a web server and may include associated sub-systems typical for a full-features implementation for a small or large on-line retailer or similar organization. The servers 210, 212 may use a common or distinct back-end business system that manages inventory and pricing for their respective sites' web pages 204, 206—where such management may be merged for convenience even though the store fronts are provided through separate domains. In some examples, the inventories and pricing may be maintained in separate sub-systems, but the order and shipping systems may be merged.

A transaction tracking server sub-system 214 may allow actions taken by users on one web page (e.g., web page 204) to persist as such users navigate to another web page (e.g., web page 206). The sub-system 214 may be tasked with generating and maintaining structural elements that persist in such manner between different web sites. As shown by dashed lines to each of servers 210, 212, the sub-system 214 may communicate through network 208 with the servers 210, 212, or may communicate only through a more local network, such as when the sub-system 214 is co-located geographically with servers 210, 212.

Particular example components are shown in the sub-system 214 for carrying out such cross domain tracking functionality that permits an object like a virtual shopping cart to persist even as a computer user navigates from one web domain to another. For example, a cart interface 220 may generate markup code, JavaScript, CSS, and other content needed to present a persistent representation of a shopping cart within and between different web sites. Such content may be responsive to user selection of items at the particular web sites so as to update what is shown in the shopping cart, including by showing textual or graphical representations of selected objects, prices and quantities of those objects, and a total price of all items that have been selected by a user across multiple different web sites to be placed into a virtual shopping cart.

Security module 218 may be provided to prevent illicit interaction with the web sites and the shopping cart, along with other content that is served to computing device 202. For example, communications from the cart interface 220 and to the cart interface 220 may be encrypted and may use, for example, an HTPPS protocol. In addition, client computer 202 may be required to submit particular information in order for sub-system 214 to carry out monetary transactions with computer system 202.

Transaction computation module 216 may generate content for serving to computer 202 that permits for dynamic operation of the shopping cart or other such structure that is presented persistently across domains to a user. For example, where the cart interface 220 may provide content for particular items that have been selected by a user, the transaction computation module 216 may provide additional code that, for example, allows a shopping cart displayed to a user to compute a total transaction cost on the computer 202 by adding up the costs of each item that would be part of a transaction if the user were to complete a transaction at the current time, and perhaps also to compute shipping and tax to be added to the total. Alternatively, or in addition, the transaction computation module 216 may perform operations needed to close out the cart when a user instructs the system 200 that the user would like complete his or her purchase of items that were accumulated in the cart across multiple web sites and domains. For example the module 216 may obtain information from other parts of the system 200 to identify which items a user has selected to purchase, to determine a total cost for those items, to compute sales tax and shipping costs (including by determining whether the items can be provided in a single shipment or must be providing in multiple different shipments either because they are stored in different warehouses or because they must be shipped at different times (e.g., one item is in stock and the other is on deep back order)), and to report out to other parts of the system a transaction that has been completed, including to a back-end order and financial processing system for the overall system 200.

Particular data that is needed to carry out these processes may be stored in a variety of forms, with examples provided here for simplicity. For example, a transaction information database 222 may store information needed to track transactions that various users are in the process of performing or that they have performed in the past. For example, the transaction information database 222 may track which items a user has placed in a shopping cart, so that the transaction computation module 206 may use such information to complete a transaction when a user indicates an intent to make such a complete transaction.

Similarly, user information database 224 may store data about particular users of the system and/or may obtain such information from other databases in the system. Such data may include a user identification number, user credentials for log ins, credit card information, mailing address information, and the like.

In this manner, then, system 200 may provide the structures that are needed in order to allow a user to navigate smoothly between different web sites that might be hosted by different web domains as compared to each other. It also provides structures that may aid a user in such cross-domain navigation, including the generation of messages to alert a user that they will not lose persistent data that they have generated at a site for a first domain if they switch to a site for a different domain.

Using such structures, then, the system 200 can provide for web-based interaction with a large number of users through multiple served web pages that are served from different web domains. Each of the pages may include purchasing functionality, and a shopping cart that is started (e.g., by selecting a first item for purchase) when a user is at a page for a first domain may be persisted across other domains. As described above for FIG. 1, the structures just described may also provide an explicit message to the user when the user first shows an intent to navigate from one web page to a web page for a different store, where the message may indicate that the shopping cart the user has started will follow the user and persist at the next domain. In certain examples, in the systems described here and the process described with FIG. 3 below, the system, when a user indicates an intent to switch pages such as by hovering over an icon for another page, may first determine whether the user has placed an item in their cart as part of the current session, and may display the explicit message only if there is an item in the cart already, and not display it if no items are in the cart.

Figure 3:
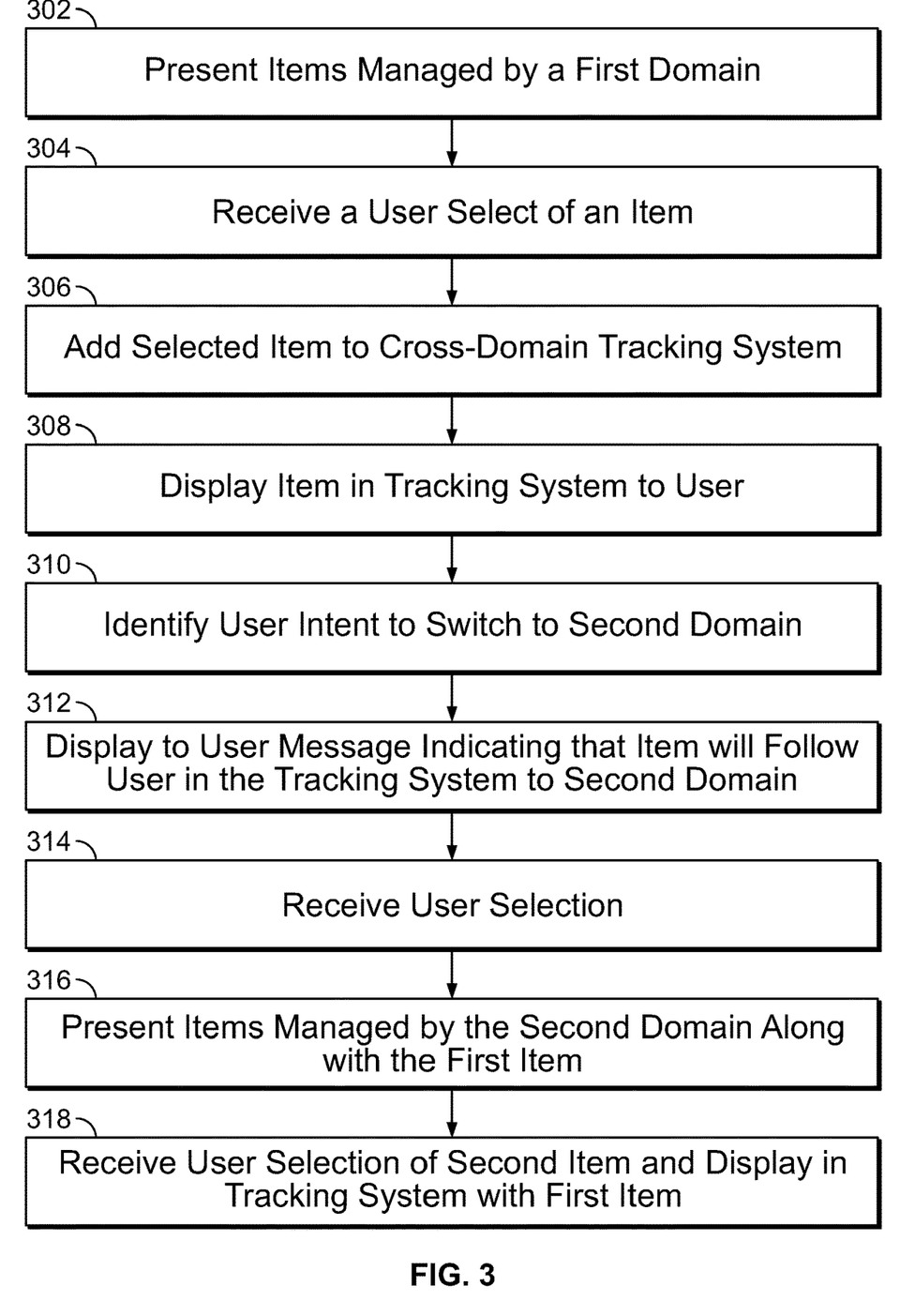
FIG. 3 is a flow chart of a process for assisting a computer user in navigating from a first web site to a second web site.

FIG. 3 is a flow chart of a process for assisting a computer user in navigating from a first web site to a second web site. In general, the process involves allowing a consumer to interact with a commercial web site, such as by selecting items to buy and having those items placed in a shopping cart representation. The user may also switch to other domains (e.g., that present different on-line stores that present different types of products as compared to the initial store) to continue his or her shopping, and the shopping cart may follow them when they switch between domains. To help inform the user in advance that the cart will follow them when they change stores/domains, the process may determine when a user desires to switch domains as a result of identifying a current action by the user, and may provide an explicit message to the user indicating that a domain switch will be accompanied by portability of the shopping cart from one store/domain to the next.

The process begins at box 302, where items managed by a first domain may be presented to a computer user through a web browser. The items may include physical items that are for sale by a merchant web site, and that may be purchased online through the web site. The presentation of such articles may take a variety of forms, including by displaying one or more digital images of the product (whether on a page by itself or with other products), displaying a textual description of the product, displaying a price of the product, and providing one or more user-selectable controls to indicate a desire to acquire the product (e.g., a "quantity" button, a "size" button, a "color" button, and/or an "add to cart" button).

At box 304, the process receives a user selection of one item from among the presented items. For example, a user may select a "buy" button on a commercial web site to add to a shopping cart the item associated with the button, such as a piece of clothing at a fashion web site. Such a selection may cause a persistent shopping cart user interface representation to be generated and displayed to the user. Such a representation may be as simple as a small rectangle showing an image of a shopping cart or shopping basket, and a numeric piece of text indicating the amount of money in products that are currently in the shopping cart. For example, if the user had not previously selected any items, no shopping cart may have previously been presented visually to them, or a shopping cart with the number 0 may have been presented in a header to a page or elsewhere. As soon as the user selects an item to add to the shopping cart, the visual representation of a shopping cart may be generated and left in place of the prior representation on a display, and information may be generated to indicate what was placed in the shopping cart (boxes 306,308), with such information being reflected on the browser and also in a back-end server-side system.

At box 310, a user's intent to switch to a second domain is identified by the process. Such user intent may be identified in a number of different manners. For example, a user may hover a pointer from a graphical user interface over, or closely adjacent to, an icon whose selection will cause the user to be switched to the second domain. Such an icon may be grouped with other icons that each would navigate the user to additional different domains if the user were to select them. For example, a single large merchant may have a variety of distinct brands under which it sells its products and may have established a domain for each such brand.

The web site at each domain may bear similarities to the web sites at the other domains for consistency, but may include significant differences so that each brand may maintain its own separate identity from the other brands. A row of icons in the form of a GUI ribbon may be presented persistently at a common location across the various different domains so that a user has a consistent message about their ability to switch from one store to another simply by clicking on the icon for the store they want to switch to, and where the particular icons that are currently displayed will represent each of the stores for the organization that the user is not currently in, e.g., if there are n stores, there will be n–1 icons at any given time.

At box 312, the system displays to the user a message that indicates that the shopping cart or other persistent item will follow the user in the tracking system if the user switches to the second domain. For example, a relatively small pop-up window may be presented at the location of the pointer (meaning precisely at, or very near to the location of the pointer or icon) where the pointer is floating over the icon for the second domain, and text inside that window may indicate to the user that the shopping cart will persist if the user clicks at the icon. Particular example phrases that may be displayed to the user are listed above, and may be accompanied by a graphic, such as a small graphic of a shopping bag or cart, to cement in the user's mind what the message is about, and to allow the user to immediately obtain the message without having to read the text when the user subsequently takes similar action and is presented with the message. In addition, the value currently held in the shopping cart may be displayed, so that the user receives confirmation that the cart that will persist when the user navigates to the second domain is the currently-filled cart, with all of the items that the user has previously selected to place in the cart.

At box 314, the process receives a user selection. For example, the user may click on the icon that represents the second domain so as to have a web site for the second domain loaded to and displayed by the user's browser. Such action by the user may cause the pop-up window to disappear and the web site for the first domain to be replaced by the web site for the second domain, in effect following a hyperlink that underlays the icon over which the user was hovering when the user clicked. The icons may also persist, though with an icon for the second store replaced by an icon for the first store, so as to indicate to the user that he or she may switch again to a different store among the defined group of stores hosted by different domains. In other examples, the user may move away from the icon that they previously hovered over, and the pop-up box may disappear, and then the user may hover over one of the icons again, and the pop-up box with the text indicating that the cart will persist may reappear again—with such process cycling based on what next activity the user indicates he or she will likely perform.

Where the user switches to a new store and the display changes, the user may then react by seeing that the shopping cart representation is still displayed, though now over the second web site. The user may infer from this that the shopping cart can still be used at the second web site and that it has not lost any items that were added to it from the first web site or other web site prior to the user visiting the first web site (though most likely part of the same browsing session—though the persistence of items in the shopping cart as between different sessions can be persistent or not, depending on the needs of a particular implementation).

At box 316, then, items managed by the second domain are displayed, such as by the fetching of web content that renders into a second web page that displays other items for sale and user-selectable controls for adding the items to the user's shopping cart (where the content can be served from a web domain that differs from that of the first domain). The shopping cart may persist by using a number of techniques, including by the two domains each maintaining cookies for the browser and associating those respective cookies to a user account on a server back-end system. In addition or alternative, the persistent element such as a shopping cart may be maintained in an iFrame that may communicate either directly on the client or via the server back-end with elements that define and generate the main web pages.

With the new and persisted visual elements giving the user a proper context, the user may then interact with the second web page. For example, if the user sees an item on the second web page that the user likes, he or she may select it (e.g., click a "buy" button next to a representation of the item) which may cause it to be added to the shopping cart or other persistent structure that traveled between the pages for the two different domains. Such selection is indicated in the figure by box 318.

Ultimately, the user may decide that they want to check out, and may do so in a familiar manner by selecting a "check out" or similar user-selectable control, which may cause them to be presented with a check out page that shows all items in the shopping cart, along with information for sales tax, shipping and handling, promotion codes, and the like so that the user may make appropriate selections and inputs, and close out their session. The check-out page may also present visual identifiers for one or more of the stores associated with the organization that manages the related stores the user was able to use a common shopping cart with. In some implementations, only the stores that the user visited during the browsing session may have their indicators (e.g., their logos) displayed, or only the stores from which the user selected an item for purchase during the session may have their indicators displayed. Such display of identifiers may further cement in the user's mind that the transaction they are about to carry out spans across the multiple different stores they may have visited or selected items from.

The process shown here is only a part of a process that may be recursive and continuing. For example, the user in this example could check out and simply end a session after paying for the items the user has selected. But the user could also continue adding items to the shopping cart, either from the second web site or after navigating to yet other web sites that share the shopping cart. In a situation in which the user seeks to navigate to a site not supported by the shopping cart, the navigation may be temporarily blocked, and an explicit warning message may be presented to the user indicating that the shopping cart or other displayed structure will not follow them, and giving them a chance to either check out before navigating to the new unsupported site, or to cancel the navigation entirely. Alternatively, the shopping cart may be removed from display when the user is at such out-of-network stores, and may then be re-presented with the shopping cart (and whatever items were last in it) when the user re-enters a site that supports the shared shopping cart.

Figure 4:
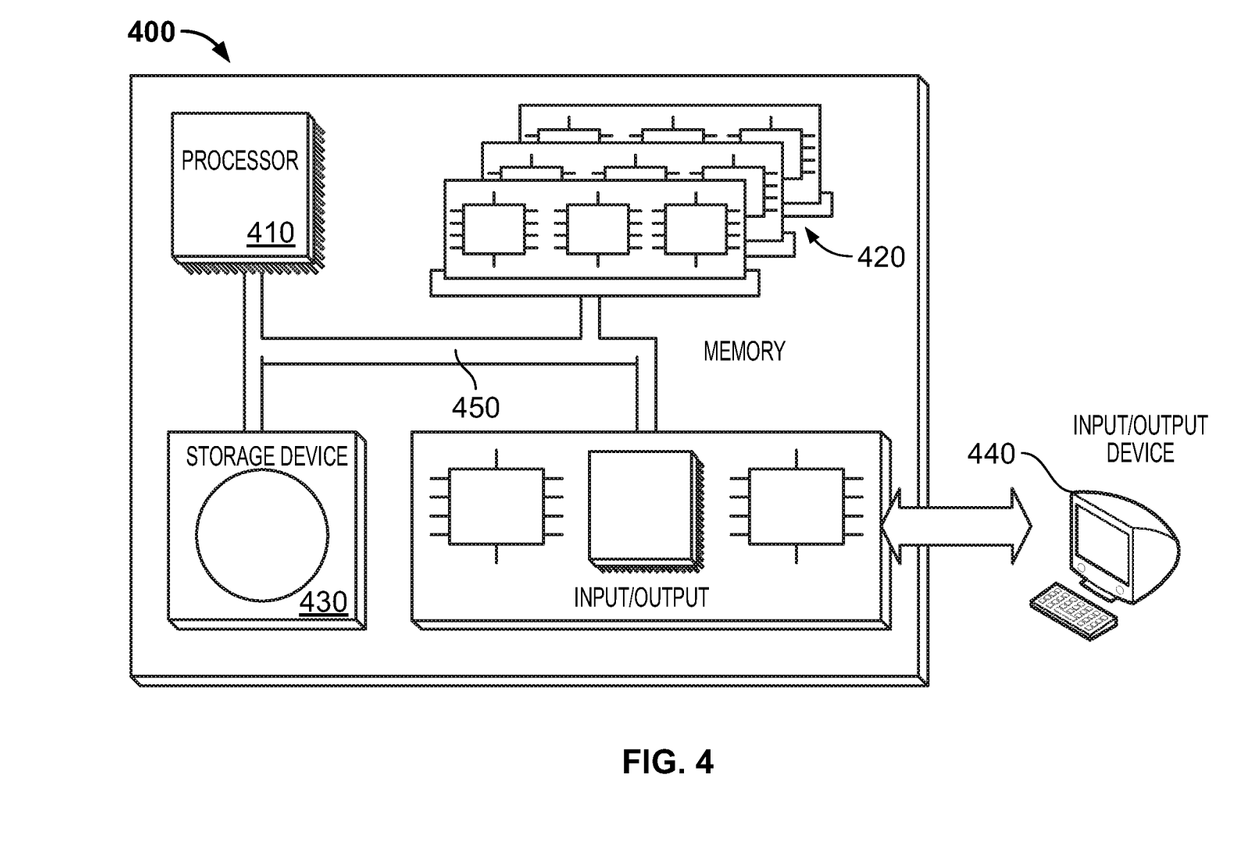
FIG. 4 is a schematic diagram of an example computer system that can be used to perform the operations associated with the computer-implemented methods and other techniques described herein.

FIG. 4 is a schematic diagram of a computer system 400. The system 400 can be used to carry out the operations described in association with any of the computer-implemented methods described previously, according to one implementation. The system 400 is intended to include various forms of digital computers, such as laptops, desktops, workstations, personal digital assistants, servers, blade servers, mainframes, and other appropriate computers. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    displaying to a user of a web browser, and on a first web page of a first web domain, one or more items for purchase from a first web domain and a ribbon of visual controls whose selection causes navigation to web domains other than the first web domain;
    receiving from the user a selection of a first item of the one or more items from the first web domain, and adding the first item to a cross-domain tracking system and to a display on the first web page that an item has been selected by the user;
    determining that the user has hovered over a visual control in the ribbon of visual controls;
    displaying to the user, at a location of the hovering over the visual control in the ribbon on the first web page of the first web domain, a pop-up message that indicates to the user that, if the user navigates to the second web domain, the first item will be maintained available to the user by the cross-domain tracking system after the user navigates to the second web domain; and
    receiving a subsequent user input to the visual control and performing an action in response to the subsequent user input, wherein the first web page is arranged so that:
        if the subsequent user input is a selection of the visual control, the performed action comprises displaying a web page from the second web domain, including display of an indication of the first item having been selected, and
        if the subsequent user input is a movement away from the visual control without a selection of the visual control, the performed action comprises removing the pop-up message displayed to the user, and continuing to display the first web page for the first web domain, including display of an indication of the first item having been selected.

2. The computer-implemented method of claim 1, further comprising associating a price in the cross-domain tracking system with each of the first selected item and a second selected item from a second domain to which the visual control navigates the user, and displaying with the cross-domain tracking system a total price for the first selected item and the second selected item on a web page of the second domain.

3. The computer-implemented method of claim 1, further comprising:
    displaying, before determining that the user has hovered, in a defined area on the first web page of the first web domain, a graphical representation that indicates that the first user selection of the first item was made;
    continuing to display the graphical representation while displaying the pop-up message to the user that indicates that the first item will be maintained available to the user; and
    continuing to display the graphical representation while displaying the web page from the second web domain.

4. The computer-implemented method of claim 1, wherein the ribbon comprises a plurality of icons that each represent a different web domain and that, when selected by a user, take the user to a web page for a respective web domain, and wherein determining that the user intends to navigate the web browser to a second web domain comprises determining that the user has hovered a user interface pointer over one of the icons.

5. The computer-implemented method of claim 4, wherein the plurality of icons are displayed in a linear ribbon along a peripheral edge of the first web page for the first domain.

6. The computer-implemented method of claim 1, wherein the cross-domain tracking system operates in one or more iframes for the first web page from the first web domain and the web page from the second domain.

7. The computer-implemented method of claim 1, wherein the cross-domain tracking system generates a view of multiple different items selected at multiple different domains, wherein the view is generated:
    (a) from a particular one of the domains from which an item is selectable, and (b) using a transaction identification number submitted with an HTTP request for a web page from the particular one of the domains.

8. The computer-implemented method of claim 1, wherein the cross-domain tracking system is operated separately from the first domain and the second domain, and receives communications from servers for the first domain and the second domain when an item from a respective domain is selected by the user.

9. The computer-implemented method of claim 1, wherein the pop-up message displayed on the first web page includes an indicator that items are currently held in a shopping cart of the cross-domain tracking system.

10. The computer-implemented method of claim 1, wherein the cross-domain tracking system is a common back-end system that manages inventory and pricing for both the first web domain and the second web domain.

11. The computer-implemented method of claim 10, further comprising associating a cookie provided to the first web domain and to the second web domain with the common back-end system.

12. One or more electronic devices having tangible, non-transitory recording media that store instructions that, when executed by one or more processors, generate code for performing operations comprising:
    displaying to a user of a web browser, and on a first web page of a first web domain, one or more items for purchase from a first web domain and a ribbon of visual controls whose selection causes navigation to web domains other than the first web domain;

receiving from the user a selection of a first item of the one or more items from the first web domain, and adding the first item to a cross-domain tracking system and to a display on the first web page that an item has been selected by the user;

determining that the user has hovered over a visual control in the ribbon of visual controls;

displaying to the user, at a location of the hovering over the visual control in the ribbon on the first web page of the first web domain, a pop-up message that indicates to the user that, if the user navigates to the second web domain, the first item will be maintained available to the user by the cross-domain tracking system after the user navigates to the second web domain; and receiving a subsequent user input to the visual control and performing an action in response to the subsequent user input, wherein the web page is arranged so that:

if the subsequent user input is a selection of the visual control, the performed action comprises displaying a web page from the second web domain, including display of an indication of the first item having been selected, and, if the subsequent user input is a movement away from the visual control without a selection of the visual control, the performed action comprises removing the pop-up message displayed to the user, and continuing to display the first web page for the first web domain, including display of an indication of the first item having been selected.

13. The one or more electronic devices of claim 12, wherein the operations further comprise associating a price in the cross-domain tracking system with each of the first selected item and a second selected item from a second domain to which the visual control navigates the user, and displaying with the cross-domain tracking system a total price for the first selected item and the second selected item on a web page of the second domain.

14. The one or more electronic devices of claim 12, wherein the operations further comprise:

displaying, before determining that the user has hovered, in a defined area on the first web page of the first domain, a graphical representation that indicates that the first user selection of the first item was made;

continuing to display the graphical representation while displaying the message to the user that indicates that the first item will be maintained available to the user; and continuing to display the graphical representation while displaying the web page from the second web domain.

15. The one or more electronic devices of claim 12, wherein the ribbon comprises a plurality of icons that each represent a different web domain and that, when selected by a user, take the user to a web page for a respective web domain, and wherein determining that the user intends to navigate the web browser to a second web domain comprises determining that the user has placed a user interface pointer over one of the icons.

16. The one or more electronic devices of claim 15, wherein the plurality of icons are displayed in a linear ribbon along a peripheral edge of the first web page for the first domain.

17. The one or more electronic devices of claim 12, wherein the cross-domain tracking system operates in one or more iframes for the first web page from the first web domain and the web page from the second domain.

18. The one or more electronic devices of claim 12, wherein the cross-domain tracking system generates a view of multiple different items selected at multiple different domains, wherein the view is generated:

(a) from a particular one of the domains from which an item is selectable, and (b) using a transaction identification number submitted with an HTTP request for a web page from the particular one of the domains.

19. The one or more electronic devices of claim 12, wherein the cross-domain tracking system is operated separately from the first domain and the second domain, and receives communications from servers for the first domain and the second domain when an item from a respective domain is selected by the user.

20. A computer-implemented system, comprising:

one or more computer processors; and tangible, non-transitory computer-readable media connected to the one or more processors and storing instructions that, when executed by the one or more computer processors, generate code for implementing operations comprising:

displaying to a user of a web browser, and on a first web page of a first web domain, one or more items for purchase from a first web domain and a ribbon of visual controls whose selection causes navigation to web domains other than the first web domain;

receiving from the user a selection of a first item of the one or more items from the first web domain, and adding the first item to a cross-domain tracking system and to a display on the first web page that an item has been selected by the user;

determining that the user has hovered over a visual control in the ribbon of visual controls;

displaying to the user, at a location of the hovering over the visual control in the ribbon on the first web page of the first web domain, a pop-up message that indicates to the user that, if the user navigates to the second web domain, the first item will be maintained available to the user by the cross-domain tracking system after the user navigates to the second web domain; and receiving a subsequent user input to the visual control and performing an action in response to the subsequent user input, wherein the web page is arranged so that:

if the subsequent user input is a selection of the visual control, the performed action comprises displaying a web page from the second web domain, including display of an indication of the first item having been selected, and, if the subsequent user input is a movement away from the visual control without a selection of the visual control, the performed action comprises removing the pop-up message displayed to the user, and continuing to display the first web page for the first web domain, including display of an indication of the first item having been selected.

21. The computer-implemented system of claim 20, wherein the operations further comprise associating a price in the cross-domain tracking system with each of the first selected item and a second selected item from a second domain to which the visual control navigates the user, and displaying with the cross-domain tracking system a total price for the first selected item and the second selected item on a web page of the second domain.

22. The computer-implemented system of claim 20, wherein the operations further comprise:
- displaying, before determining that the user has hovered, in a defined area on the first web page of the first domain, a graphical representation that indicates that the first user selection of the first item was made;
- continuing to display the graphical representation while displaying the message to the user that indicates that the first item will be maintained available to the user; and
- continuing to display the graphical representation while displaying the web page from the second web domain.

23. The computer-implemented system of claim 20, wherein the ribbon comprises a plurality of icons that each represent a different web domain and that, when selected by a user, take the user to a web page for a respective web domain, and wherein determining that the user intends to navigate the web browser to a second web domain comprises determining that the user has placed a user interface pointer over one of the icons.

24. The computer-implemented system of claim 20, wherein the cross-domain tracking system generates a view of multiple different items selected at multiple different domains, wherein the view is generated:
- (a) from a particular one of the domains from which an item is selectable, and
- (b) using a transaction identification number submitted with an HTTP request for a web page from the particular one of the domains.

\* \* \* \* \*